May 20, 1930.  M. H. KOTZEBUE  1,759,750
GAS AND LIQUID CONTACT APPARATUS
Filed May 26, 1927  4 Sheets-Sheet 1

INVENTOR
Meinhard H. Kotzebue
BY
ATTORNEYS

May 20, 1930.　　　M. H. KOTZEBUE　　　1,759,750
GAS AND LIQUID CONTACT APPARATUS
Filed May 26, 1927　　4 Sheets-Sheet 3

INVENTOR
M. H. Kotzebue.
BY
ATTORNEYS

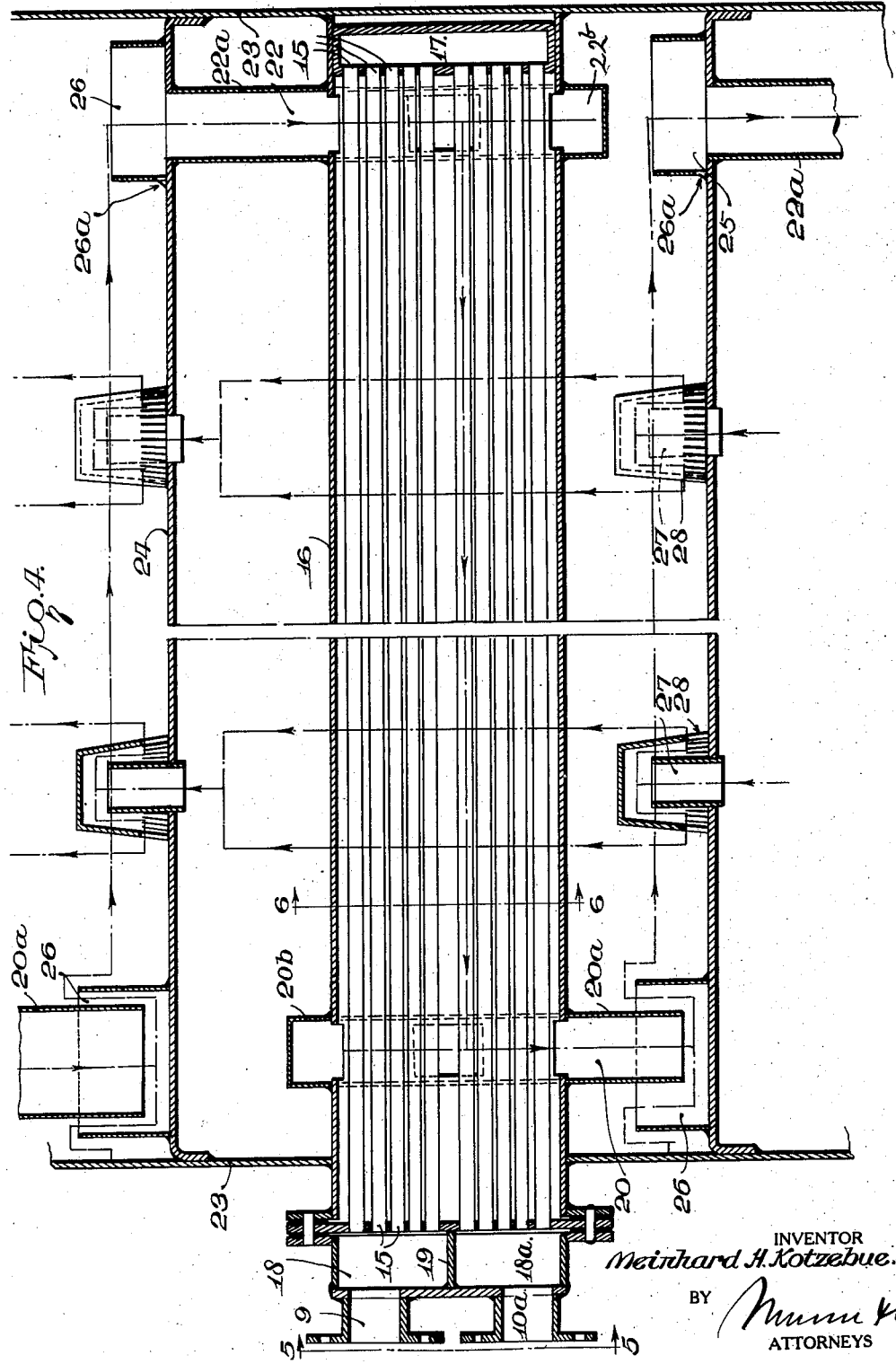

Patented May 20, 1930

1,759,750

UNITED STATES PATENT OFFICE

MEINHARD H. KOTZEBUE, OF TULSA, OKLAHOMA

GAS AND LIQUID CONTACT APPARATUS

Application filed May 26, 1927. Serial No. 194,430.

This invention relates to a gas and liquid contact apparatus, and in particular to control sections for bubble trays which are ordinarily super-imposed upon one another to constitute a tower for the absorption of gases in liquids or the distillation of gas from a liquid in which the said gas has been previously dissolved.

The object of the invention is to provide a unit which will closely control the temperature of the reflux liquids so as to obtain the absorption or distillation whichever is desired.

Another object of the invention is to provide a construction in which operation can be obtained when the heat exchange element thereof is entirely removed.

Another object of the invention is to provide a construction in which heat transfer occurs even though the gas pressure available and therefore the temperature gradient be very low.

Another object of the invention is to provide a construction in which the units may be fastened together in either series or parallel.

Referring now to the drawings,

Figure 4 is a somewhat enlarged sectional view of a bubble control tray.

Figure 6 is a sectional view through one of the heat interchangers taken, for instance, along the line 6—6 of Figure 4.

Figure 7 is a plan view partly in section taken from the top of the tower shown in Figure 1, along the line 7—7.

Figure 1:
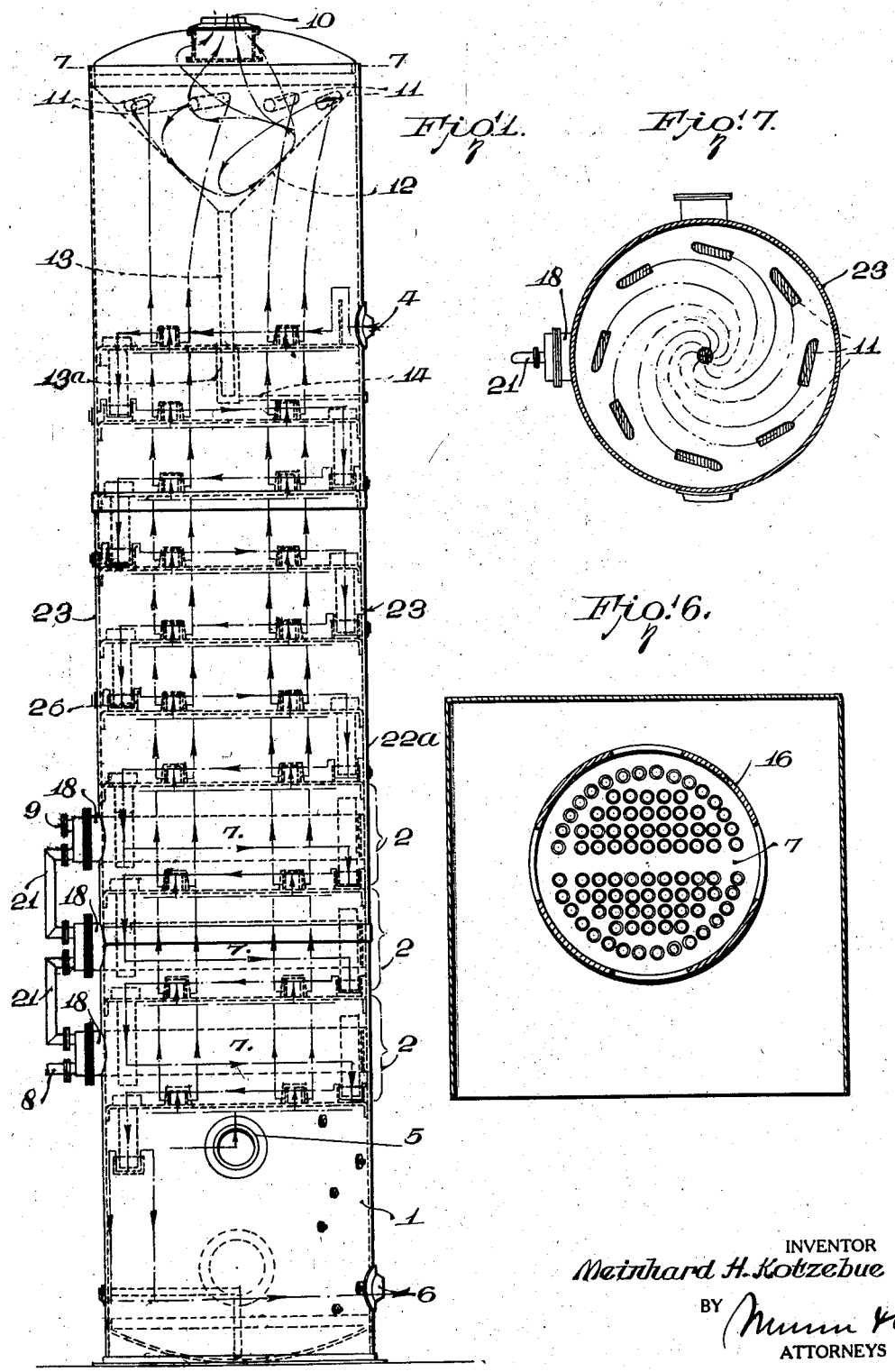
Figure 1 shows a side elevation of a tower comprising a plurality of the units superposed upon one another and provided with suitable top and bottom end sections to provide a complete gas absorption or distillation tower.

Referring now again to Figure 1, 1 indicates the base section of a tower upon which the bubble tray sections 2, 2, 2, etc. are adapted to be superposed, while 3 indicates a top section adapted for the entrance of absorption liquid and for the exit of the stripped gases.

The apparatus is shown and described particularly with reference to the absorption of gasoline from natural gas by means of heavy lubricating oil, or other suitable absorption liquid. In the tower shown in Figure 1 the opening 4 is adapted to receive a continuous supply of absorption oil which is allowed by the construction of the tower to enter at the top and to flow down through the bubble tray sections while coming into intimate contact with a supply of gasoline bearing natural gas which has been introduced into the bottom of the tower through the opening 5. After the absorption oil has completed its travel through the tower it finds its exit from the bottom through the opening 6 and may be carried from there to any suitable storage or distillation apparatus.

A suitable heating or cooling fluid may be introduced into the tubes of the heat exchanging sections 7 of the bubble tray sections 2 through the large openings 8 or 9. It is to be understood from the drawing shown in Figure 1 that only a few complete bubble trays have been shown, but as many of them may be used in the tower as are deemed to be advisable. The cooling or heating liquid may be introduced either from a bottom opening such as 8, or from a top opening such as 9, although it is preferably introduced from below. By the arrows it may be seen approximately what path the gas and oil take in going through the tower, these paths being more particularly described in the matter referring to Figure 4. The top section of the tower 1 has an opening 10 for the exit of stripped gas and means to give this gas a rapid centrifugal swirling vortex motion before allowing it to make its exit through the opening 10. For this reason a number of nearly tangential inlet pipes 11 also seen in plan in Figure 7, are provided in a funnel shaped baffle plate 12 at the top of the tower. The gas must pass through these inlets 11 in order to find its way to the opening 10. From the position and inclination of the openings 11, it will be readily understood that a swirling motion will be imparted to the gases and will cause them to deposit upon the walls of the baffle 12 any droplets of gasoline or oil mechanically carried up into the top of the tower. The droplets will run down the baffle 12 and into the funnel stem 13 sealed by a liquid seal cup 13$^a$ and into said cup which is held by a small rod 14. Thereby the baffle will allow refluxing of the recovered liquid back into the tower. A heat exchanger 7 (shown clearly in Figure 4) consists of a cylindrical nest of tubes, preferably of cooper, or thin steel, said tubes being securely fastened into flue sheets 15, the entire nest of tubes and the flue sheets are carried within a shell 16 which extends from some distance beyond the tubes on each of their ends and forms on each end, chambers 17, 18 and 18$^a$. The chambers 18 and 18$^a$ are separated from each other by a wall 19 and are provided each with a large opening, flanged for a pipe connection 9 and 10. From such construction it will be understood that a heating or cooling liquid introduced through the opening 9 will occupy the chamber 18, hence continue through the upper half of the nest of tubes and through the tubes to the chamber 17 which being undivided will fill with liquid and return the liquid to the chamber 18$^a$ through the lower part of the nest of tubes. From the chamber 18$^a$ the liquid will flow as shown in Figure 1 to the next intercooler section. It will be understood from the construction that the heating or cooling liquid may just as well be introduced through the opening 8, on an upward path instead of a downward one and be exhausted from the opening 9. Arrangement of the tubes within the heat exchanger is shown in Figure 6, which is a sectional view taken along the line 6—6 of Figure 4. The shell of the heat exchanger 16 is provided with transverse openings 20 and 22, respectively surrounded by casings 20$^a$ and 22$^a$ securely attached to the shell 16.

Figure 2:
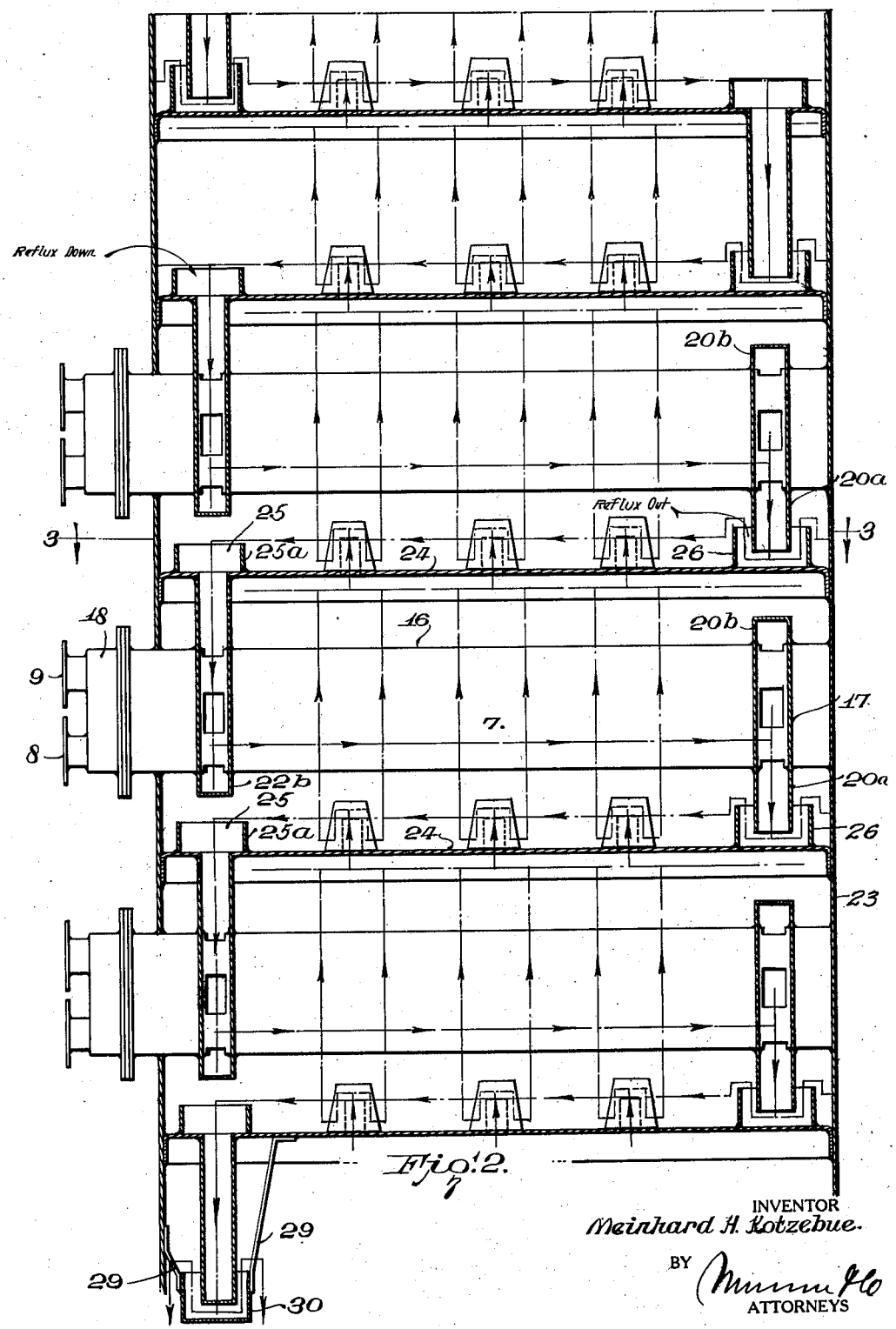
Figure 2 is a central vertical section partly in elevation of the middle portion of such a tower, the controlled sections being clearly shown.

Describing now the bubble tray with particular reference to Figures 2 and 4, 23 represents the wall of the tower having therein a plurality of shelves 24, which are provided with a plurality of raised tube openings 27 therein, said tube openings being surrounded by caps 28 to provide submerged blast bubbling units of the well known and usual type. Each of said shelves is provided with an opening 25. These are surrounded by a wall 25$^a$ in which a small hole is bored as at 26$^a$ in Fig. 4. Located upon each shelf 24 at the side opposite to the opening 25 is a wall formation constituting a cup 26. The cup 26 is somewhat higher than the wall 25$^a$, and has extending into it a tube 20$^a$ which is a delivery pipe from the heat exchanger unit 7. Below the opening 25 there is connected a delivery tube 22, 22$^a$ which enters into the heat exchanger shell 16. In the lower part of this shell there is a sump 22$^b$ to catch any dirt which may be introduced with the absorbing oil. On the opposite end of the heat exchanger the tube 20$^a$ is provided with an upwardly extending portion 20$^b$ located on the top of the shell 16. The casing 20$^a$ extends into the cup 26 of the tray below and corresponds to 25$^a$ described in the tray above.

Figure 3:
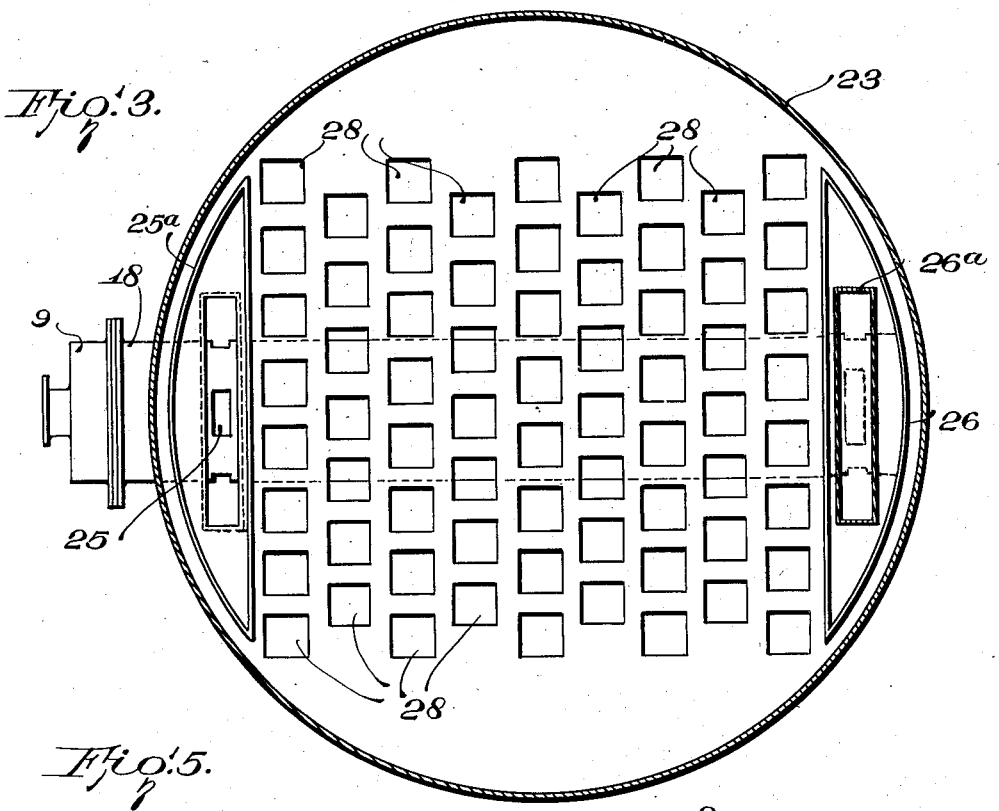
Figure 3 is a horizontal section taken on the line 3—3 of Figure 2.

In Figure 3 may be seen the arrangement of the bubbling units on a tray, as seen from above. In this view the heat interchanger is hidden by the tray.

Figure 5:
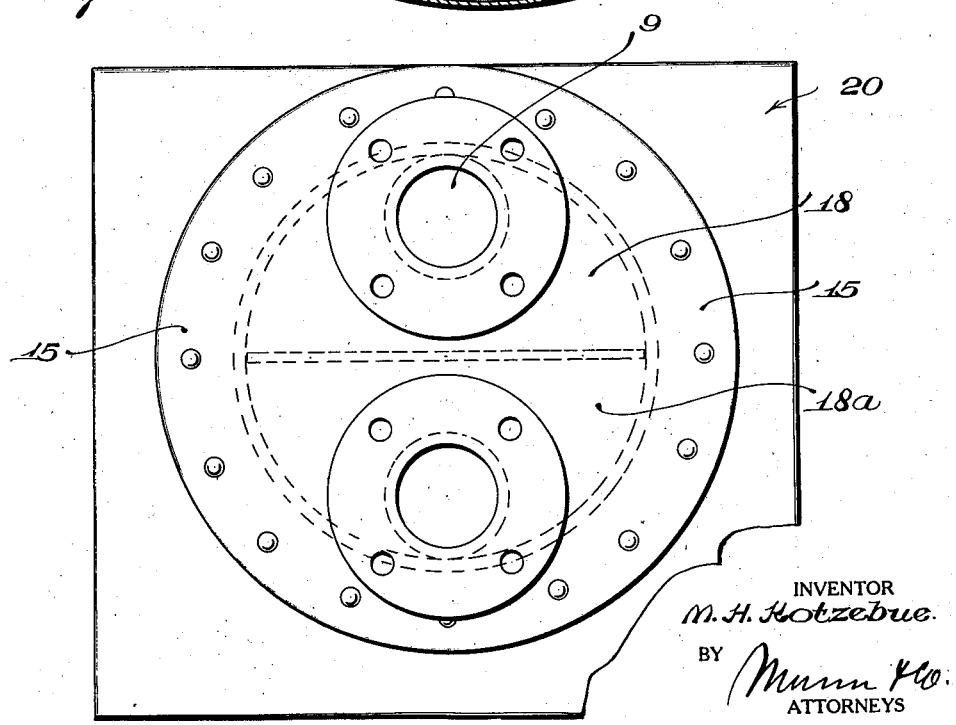
Figure 5 is a side elevation of the bubble control tray as viewed from along the line 5—5 of Figure 4.

In Figure 5 is shown, the flue sheet 15 of the interchanger riveted to the casting which constitutes the chambers 18 and 18$^a$. The flue sheet is held in a larger sheet 23 which is convex and which when riveted to the rest of the circular wall constituting a control section, becomes a part of the tower.

From this description it will be obvious to those skilled in the art that the gas to be stripped occupies the whole cross section of the tower, but does not enter the heat exchanger shell 16. The gas ascends the tower through the tube openings 27 and bubbles through the layer of oil which lies on the tray 24, said bubbling being under the edge of the cap 28 from whence the gas extends to the corresponding openings in the next higher tray or shelf.

The oil lying on the tray 24 is prevented from refluxing through the tube opening 27 by the gas pressure thereon from below, but overflows the casing 26$^a$ and flows down the tube 22$^a$ through the opening 22 into the heat exchanger shell 16, and over the heat exchanger tubes, being thereby heated or cooled. The oil flows along the outside of the tubes toward the opening 20, thus through said opening down the tube 20 and on to the next tray 24. The casing 25$^a$ around the lower end of the tube 20 establishes a liquid seal against the upward passage of gas into the heat exchanger space. The oil overflows the casing 25$^a$ and establishes a level on the tray 24 and again overflows the wall 26$^a$, thus repeating the cycle. Under the outlet of the lowest tray, there is fastened by metal straps 29 a cup 30, the purpose of which is to provide a liquid seal with the oil which will flow therein.

It is to be understood that my apparatus may be provided with all such accessories common and useful in this art, such as thermometers, sight glasses, pumps, piping etc. Many modifications will readily occur to those skilled in this art, and all such modifications I claim as my own if they fairly fall within the scope of the appended claims.

I claim:—

1. A tower for the absorption of gases in liquids or their distillation therefrom, comprising a plurality of superposed control sections, a heat interchanger having a plurality of transverse tubes and a casing therefor, means for delivering a liquid from one section to one end of the casing, and an exit for the liquid at the opposite end of the tube casing, said exit adapted to deliver the liquid to a succeeding section.

2. A tower for the absorption of gases in liquids or their distillation therefrom comprising a bottom portion having means for the entrance of gas and exit of liquid, a plurality of control sections superposed thereon, each of certain sections having a heat interchanger incorporated therein, each heat interchanger comprising a plurality of crosswise tubes in which a fluid medium may be circulated, an outer casing for the tubes, in which casing a liquid may be caused to flow along the tubes, an entrance pipe and an exit pipe for the tube casing, said pipes extending to bubbling trays above and below the interchanger, and means to establish a liquid seal on the end of the exit pipes.

3. A tower for the absorption of gases in liquids or their distillation therefrom, said tower having a gas inlet and outlet and a liquid outlet and inlet at each end respectively, and means within the tower for causing the gases to take a substantially vertical upward course, means for causing the liquid to take a zig-zag downward course from one side of the tower to the other, and means for heating or cooling the liquid while so circulating.

4. The method of absorbing a gas in an absorption liquid which comprises repeatedly bubbling the gas thru a layer of said liquid, and cooling the liquid between each bubbling step.

5. A bubble control section for an absorption or distillation tower, comprising a wall section adapted to fit upon the top of a similar wall section, a bubbling tray attached in a horizontal position interiorly of the wall portion, a horizontal tubular heat interchanger interior to said wall portion and above the said bubbling tray, a casing for said interchanger, entrance and exit pipes for said interchanger on opposite ends thereof, said exit pipe having means surrounding the pipe to provide a liquid seal therefor.

6. Apparatus of the character described comprising a tower, a plurality of trays located within the tower one of the trays having an opening, a heat interchanger between adjoining trays having openings near opposite walls of the tower, a casing affixed to the heat interchanger to surround the opening near one end and being in communication with the opening of the adjacent tray, a similar casing surrounding the opening at the opposite end of the interchanger and having an outlet directed toward the other adjacent tray, and a cup carried by said tray into which said casing may discharge.

7. Gas absorption apparatus comprising a plurality of enclosed bubbling trays, and temperature control elements associated with certain trays for regulating the temperature of absorption liquid on particular trays.

8. Gas absorption apparatus comprising a plurality of enclosed bubbling trays, means associated with each tray permitting a gas to filter through on an upward course, and a number of temperature control elements associated with certain trays, including means near opposite ends for the influx and efflux of an absorption liquid traversing the trays on a tortuous downward course.

9. Apparatus of the character described comprising adjoining bubble trays for containing an absorption liquid, means associated with each tray permitting passage of a gas both through the trays and the liquid carried thereby, a temperature control element located intermediately of the trays having means at one end affording communication with one end with an opening in one of the trays for the influx of the liquid and means at the other end for the efflux of the liquid to the succeeding tray, and means associated with said last means establishing a liquid seal.

MEINHARD H. KOTZEBUE.